United States Patent
Tyroler (10) Patent No.: US 7,551,076 B2
(45) Date of Patent: Jun. 23, 2009

(54) OBJECT LOCATOR FEATURE AS PART OF A SECURITY SYSTEM

(75) Inventor: Dan Tyroler, Great Neck, NY (US)

(73) Assignee: Honeywell International Inc., Morristown, NJ (US)

( * ) Notice: Subject to any disclaimer, the term of this patent is extended or adjusted under 35 U.S.C. 154(b) by 77 days.

(21) Appl. No.: 10/702,290

(22) Filed: Nov. 6, 2003

(65) Prior Publication Data

US 2005/0099293 A1 May 12, 2005

(51) Int. Cl.
*H04Q 1/30* (2006.01)
*G08B 21/22* (2006.01)

(52) U.S. Cl. ............ 340/539.11; 340/506; 340/539.13; 340/3.1; 340/3.5; 340/572.1; 340/573.1

(58) Field of Classification Search . 340/539.1–539.32, 340/541, 568.1–572.1, 573.4, 825.49, 3.1, 340/506

See application file for complete search history.

(56) References Cited

U.S. PATENT DOCUMENTS

| | | | |
|---|---|---|---|
| 5,638,050 A | | 6/1997 | Sacca et al. |
| 5,786,764 A | * | 7/1998 | Engellenner ............. 340/572.4 |
| 5,949,335 A | * | 9/1999 | Maynard ................. 340/572.1 |
| 6,133,832 A | | 10/2000 | Winder et al. |
| 6,297,737 B1 | | 10/2001 | Irvin |
| 6,535,120 B1 | | 3/2003 | Sebanc et al. |
| 6,573,832 B1 | | 6/2003 | Fugere-Ramirez |
| 6,788,199 B2 | * | 9/2004 | Crabtree et al. ........ 340/539.13 |
| 6,825,763 B2 | * | 11/2004 | Ulrich et al. ............. 340/539.1 |
| 7,019,639 B2 | * | 3/2006 | Stilp .......................... 340/531 |
| 7,027,808 B2 | * | 4/2006 | Wesby ........................ 455/419 |
| 7,053,764 B2 | * | 5/2006 | Stilp ........................... 340/506 |
| 2001/0049629 A1 | | 12/2001 | Freeman |
| 2002/0126010 A1 | * | 9/2002 | Trimble et al. ........... 340/568.1 |
| 2004/0169589 A1 | * | 9/2004 | Lea et al. ............... 340/825.49 |
| 2004/0212500 A1 | * | 10/2004 | Stilp .......................... 340/541 |
| 2004/0217859 A1 | * | 11/2004 | Pucci et al. ............ 340/539.32 |

OTHER PUBLICATIONS

Data sheet for "Now You Can Find It", www.sharperimage.com, 12 pp., printed Nov. 15, 2004.

* cited by examiner

*Primary Examiner*—Davetta W Goins
*Assistant Examiner*—Anne V Lai
(74) *Attorney, Agent, or Firm*—Husch Blackwell Sanders Welsh & Katz

(57) ABSTRACT

An object locator feature is incorporated into a security system that includes a user interface device with a display, keypad and associated transmitter. Wireless RF electronic tags with sounders are attached to different objects, e.g., an inanimate object, or a living being such as a child or pet. Each tag has an identifier such as a serial number that is learned to the user interface device by the user typing in the identifier of each tag. The user also types in descriptive information regarding the object with which the tag is associated, The user can edit the entries by adding or deleting objects, or changing the descriptive information. In a search mode, the user can select an object by its name or an assigned sequence number. In a polling mode, the electronic tags are periodically polled to confirm the presence of the associated object to the user.

26 Claims, 5 Drawing Sheets

OBJECT LOCATOR FEATURE AS PART OF A SECURITY SYSTEM

BACKGROUND OF THE INVENTION

1. Field of Invention

The invention relates generally to a method and system for using a security system to locate objects such as small objects that are misplaced in a household, or living beings such as children or pets.

2. Description of Related Art

Oftentimes objects such as car keys, glasses, remote television controls and the like are misplaced in the home. The result is frustration and lost time for the person who must conduct a search to locate the object. Various wireless devices have been developed to assist people in locating lost objects in their homes. However, these devices are relatively simplistic and have various limitations. For example, one device provides a key chain that sounds off when the user whistles or claps. Another device uses a transmitter on a key chain to locate a receiver on a second key chain. However, this assumes that both key chains have not been misplaced. Moreover, the transmitter and receiver must be used as a matched pair. Other approaches for tracking inventory or vehicles are more sophisticated but require a complete "clean sheet" system to be developed at great cost.

BRIEF SUMMARY OF THE INVENTION

To overcome these and other deficiencies in the prior art, the present invention describes an object locator feature that can be integrating into an existing security system, such as in a home or small business.

In one aspect of the invention, a security system with an object locator feature includes a user interface device including a user output component, e.g., a display, and a user input component, e.g., a keypad, and a memory associated with the user interface device for storing identifiers for electronic tags associated with a plurality of objects, and storing descriptive information for the plurality of objects. The user output component provides the descriptive information to a user to enable the user to select at least one of the plurality of objects via the user input component. A control is responsive to the user input component for retrieving, from the memory, the identifier for the electronic tag that is associated with the at least one selected object. A transmitter is responsive to the control for transmitting a wireless signal encoded with the retrieved identifier. The objects can be inanimate objects or living beings such as children or pets.

In another aspect of the invention, an electronic tag is provided for use with an object locator feature of a security system. The tag includes a memory for storing an identifier, a receiver for receiving a wireless signal encoded with an identifier that was retrieved by a control of the security system from a memory of the security system, a control for comparing the stored identifier to the received identifier, and a sounder responsive to the control for emitting an audible sound when the stored identifier matches the received identifier.

In yet another aspect of the invention, a security system with an object polling feature includes a user interface device including a user output component and a user input component, and a memory associated with the user interface device for storing identifiers for electronic tags associated with a plurality of objects, and storing descriptive information for the plurality of objects. The user output component provides the descriptive information to a user to enable the user to select at least one of the plurality of objects via the user input component. Moreover, a user activates a polling feature using the user interface device; A control is responsive to the user input component for retrieving, from the memory, the identifier for the electronic tag that is associated with the at least one selected object. A transmitter is responsive to the control for transmitting a wireless signal encoded with the retrieved identifier according to a polling schedule associated with the polling feature. Thus, the presence of a child or pet in or near the home can be confirmed periodically.

Corresponding methods and program storage devices are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

The invention provides an object locator feature that can be integrating into an existing security system, such as in a home or small business.

Figure 1:
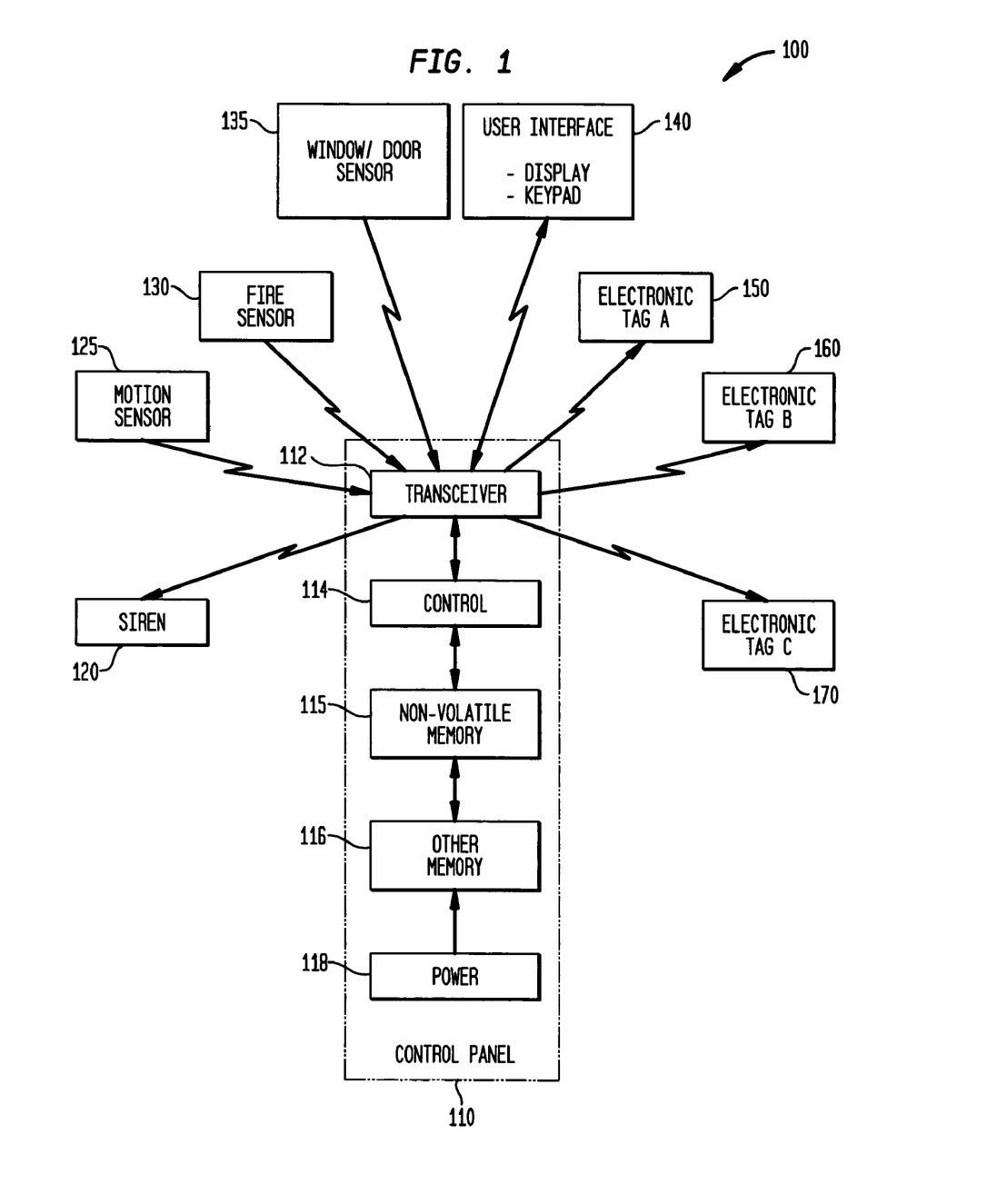
FIG. 1 illustrates an overview of an example security system with an object locator feature according to the invention.

FIG. 1 illustrates an overview of a security system with an object locator feature according to the invention. Many homes and small businesses today are equipped with security systems to deter burglaries and detect fires. The term "security" thus encompasses security from intrusion as well as fire. Other hazards such as carbon monoxide may also be monitored. A security system 100 includes a central control panel 110 that communicates with a number of sensors via a wired or wireless path. For example, the control panel 110 may receive signals from motion sensors 125 that detect when a person enters a room. Signals received from fire sensors 130, such as smoke or heat sensors, indicate that a fire has been detected. Signals received from window and door sensors 135 indicate that a window or door has been opened.

Signals received from a peripheral user interface device 140, e.g., including a keypad and display, may arm and disarm the system, as well as trip an alarm via a panic button feature. The user interface device 140 may be the primary interface between the human user and the security system 100. The user interface device 140 typically includes components that are analogous to the control panel 110, including a control, memory and power source. Optionally, the user interface device 140 includes a transceiver. The user interface device 140 is commonly provided as a wireless device to allow it to be permanently installed in the home without running wire, such as by affixing it to a wall. Or, the user interface device 140 may be a portable unit that can be placed on a table, for instance. Moreover, multiple user interface devices may be provided in a home, such as in different rooms. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110.

Various other components may communicate with the control panel 110, such as a wireless key fob that is used to trip an alarm. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, or whether a specific door or window has been opened. The control panel 110 may also have the ability to notify local emergency services of an alarm condition via telephone.

To facilitate installation and avoid the need to install wiring in a home, wireless security system components may be employed. Some components only transmit or receive. For example, the motion sensors 125, fire sensors 130, and window and door sensors 135 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One system uses signals at 345 MHz to provide a nominal indoor range of 200 feet. Different manufacturers may use different proprietary schemes for communicating data. For example, different coding and modulation techniques may be used. Components provided by Honeywell Corp. may advantageously be used.

The control panel 110 includes a transceiver (transmitter and receiver) 112 for transmitting and receiving wireless signals. The control 114 includes a microprocessor that may execute software, firmware, micro-code or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

The present inventor has determined that an object locator feature can be incorporated into an existing security system. That is, existing wireless communication components and transmitting and receiving protocols of the control panel 110 and/or user interface device 140 can be used. The only new components that are required are electronic tags that can be attached to objects to be located. The appropriate control logic can be implemented as the control panel 110 and/or user interface device 140 are upgraded. Example electronic tags 150, 160 and 170 are shown in FIG. 1 receiving a wireless activation signal from the transceiver 112. In response to the activation signal, a corresponding one of the electronic tags sounds off to reveal its location. An electronic tag may also have a light or vibrating mechanism to reveal its location.

Note that electronic tags 150, 160 and 170 could also receive wireless activation signals from a transceiver associated with the user interface device 140. The range of the wireless activation signals may be improved by using multiple transmitters. Moreover, when the user interface device 140 transmits an activation signal, the user may carry the user interface device 140 around the home to be sure that a strong signal is provided in each room. The user interface device 140 may include a microprocessor that executes software, firmware, micro-code or the like stored in memory, or a dedicated chip such as an ASIC, to control the security system 100. Thus, the intelligence for activating the electronic tags 150, 160 and 170 can be carried out at different locations in the security system 100, such as at the control panel 110 and at one or more peripheral user interface devices 140. For example, the user interface device 140 can send commands to the control panel 110, such as to command the transceiver 112 to transmit a signal to locate an object. At the same time, the user interface device 140 can command its own local transceiver to transmit an activation signal. Or, the control panel 110 can command its transceiver 112 and a transceiver in the user interface device 140 to transmit an activation signal. When multiple user interface devices 140 are used, it may be preferably for the centralized control panel 110 to act as the primary intelligence in the system 100.

Figure 2A:
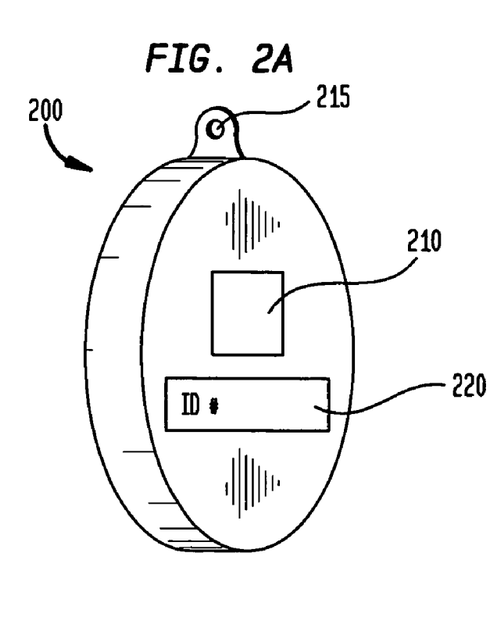
FIG. 2(a) illustrates an example rear perspective view of an electronic tag according to the invention.
Figure 2B:
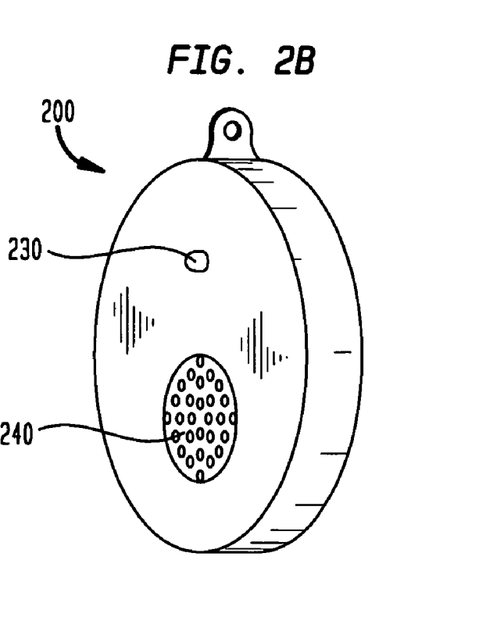
FIG. 2(b) illustrates an example front perspective view of an electronic tag according to the invention.

FIG. 2(a) illustrates a rear perspective view of an electronic tag according to the invention, and FIG. 2(b) illustrates a corresponding front perspective view. Electronic tag in a variety of configurations can be provided to facilitate attachment to objects to be located. An example electronic tag 200 may be provide in a small plastic housing that can be adhered to objects using double sided tape 210, Velcro, or adhesive, for instance, or built into an inanimate object such as a hand-held remote control, eyeglass case, purse, wallet, garment, tool, cane, key chain, and the like. Generally such objects are found around a home or small business or the like. Moreover, the electronic tag can be carried by a living being such as a child or pet. For example, the electronic tag 200 can be sewn into the lining of a garment or shoe worn by a child, or worn on a necklace, or attached to the collar of a pet dog or cat.

The tag can be designed with a slim cross section to allow it to be used to locate files in an office. An aperture 215 can be used to fasten the tag 200 to an object. An identifier 220 that is readable by the user is provided on the tag 200. The identifier 220 may include a string of characters, including numbers and/or letters, such as a serial number or other identifier, that the user uses to learn the tag and associated object into the logic of the control panel 110 and/or the user interface device 140. The identifier 220 may be provided on a sticker or molded into the tag 200, for instance. It is also possible to provide an identifier in a machine-readable form, such as in a bar code, or stored in a magnetic memory. In this case, an appropriate reader is used to recover the identifier for use by the control panel 110 and/or the user interface device 140. When the electronic tag 200 receives an activation signal that is encoded with the identifier 220 of the tag 200, the tag 200 sounds off via an audible sounder 240 to reveal its location. A light 230 or a vibrating mechanism, not shown, may also be used.

Figure 3:
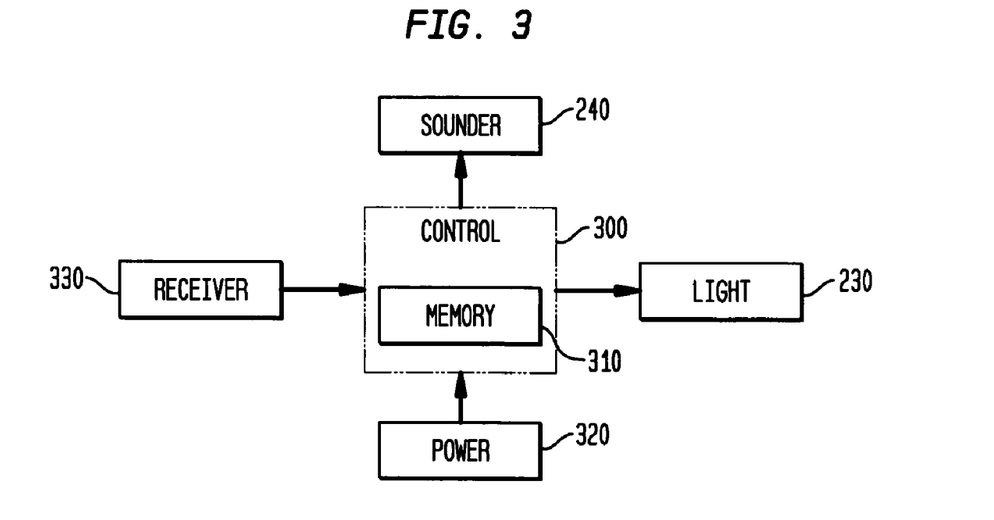
FIG. 3 illustrates an example block diagram of an electronic tag according to the invention.

FIG. 3 illustrates a block diagram of an electronic tag according to the invention. The electronic tag should be constructed economically. Generally, the electronic tag includes a receiver 330 for receiving a wireless encoded signal via a built-in antenna from the transmitter of the control panel 110 or user interface device 140. A control 300 acts a decoder to decode the identifier in the signal and determine if the identifier matches the identifier that has been assigned to the tag. For example, the memory 310 may store the identifier of the tag that was assigned at the time of the tag's manufacture. A memory resource used for storing software or other instructions that are executed by the control 300 to achieve the functionality described herein may be considered a program storage device. The identifier may also be pre-stored in an ASIC in the tag 200. The control 300 may be a microprocessor or ASIC, for example. The power source 320 may be a small Lithium battery, while the sounder 240 may be a piezo sounder, and the light 230 may be a LED. Note that the cost and size of the tag is minimized since there is no need for a transmit capability. Only a receive capability is needed to receive an activation signal. The life of the power source 320 can be extended by employing logic in the control 300 that puts the tag in a sleep or standby mode and periodically wakes it up to see if an activation signal is present.

Figure 4:
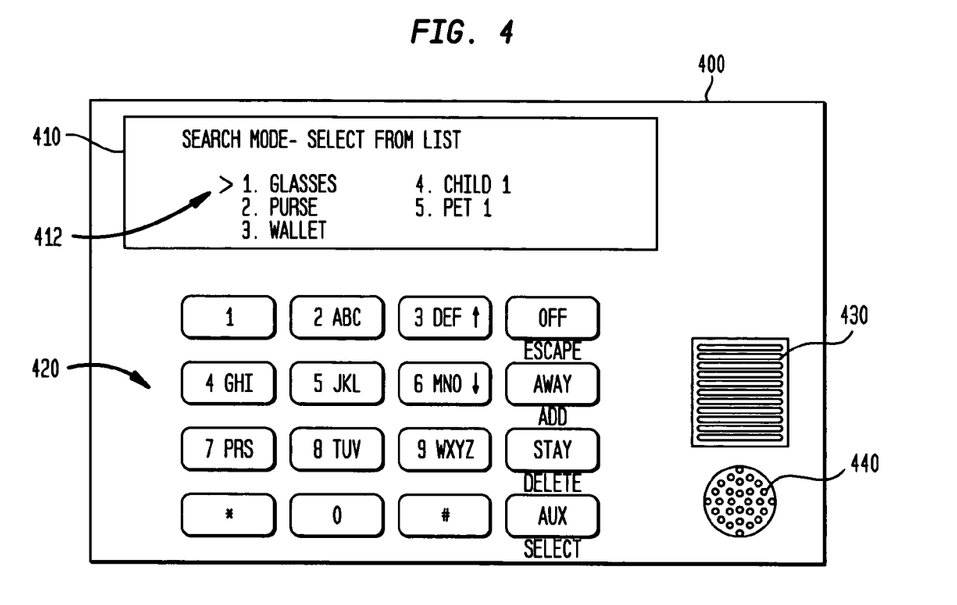
FIG. 4 illustrates an example user interface device according to the invention.

FIG. 4 illustrates a user interface device according to the invention. As mentioned, the user interface device 400 can be provided, e.g., as a peripheral to the main control panel 110, similar to the user interface device 140 in FIG. 1, or as part of the main control panel 110. The exact arrangement of components is transparent to the user since the user only interfaces with the user interface device 400. Thus, the functionality that is described herein as being provided by a user interface device may be provided wholly locally to the device 400, or partially remotely, such as at the associated control panel 110. The user interface device 400 includes a user input component such as a keypad 420 and/or microphone 440 for speech recognition in a voice-activated system, and a user output component such as a display 410 and/or speaker 430. The display 410 may be a multi-line, multi-character LCD display, for instance. The display 410 can provide a graphic device such as a cursor 412 or other highlight to indicate which object will be selected when the "select" key is pressed.

Advantageously, the user interface device 400 is of the type that is used for controlling a home security system so no re-design, e.g., to provide additional keys on the keypad 420, is necessary. In particular, functions can be assigned to existing keys to accommodate the functionality of the present invention. Each key can have more than one function as well by employing double function or soft keys. For example, the "off" key has the additional function of "escape", the "away" key has the additional function of "add", the "stay" key has the additional function of "delete", and the "aux" or "auxiliary" key has the additional function of "select". Each of the additional functions can be accessed by pressing a "shift" or "function" key or the like, or by simply entering the search mode. The "off", "away", "stay" and "aux" keys are associated with the conventional security system features, while the "add", "delete" and "select" keys are associated with the object locator feature. Note that, optionally, dedicated keys can be provided for the object locator feature.

Control logic associated with the user interface device 400 allows it to operate in an "edit" mode and a "search" mode, in addition to operating in a mode for controlling the security system. A specific key press sequence allows the user to enter each mode. In the edit mode, the user learns each electronic tag to the user interface 400 by using the keypad 420, for instance, to enter the identifiers of the electronic tags and descriptive information regarding the objects that the tags are being associated with. The user can subsequently edit the information by adding the identifiers for new tags, modifying the descriptive information that was previously entered for a tag, and deleting the information for a tag. In the search mode, the user selects a particular object to search from among the entered objects. For example, the keys in the keypad 420 having an up arrow or down arrow may be used to scroll up and down, respectively, in a list of objects, while the "select" key may be used to select a particular object. Any appropriate menu display and logic may be used. A transmitter associated with the user interface device 400 then sends a wireless activation signal that is encoded with the identifier of the selected object, as discussed below.

Figure 5:
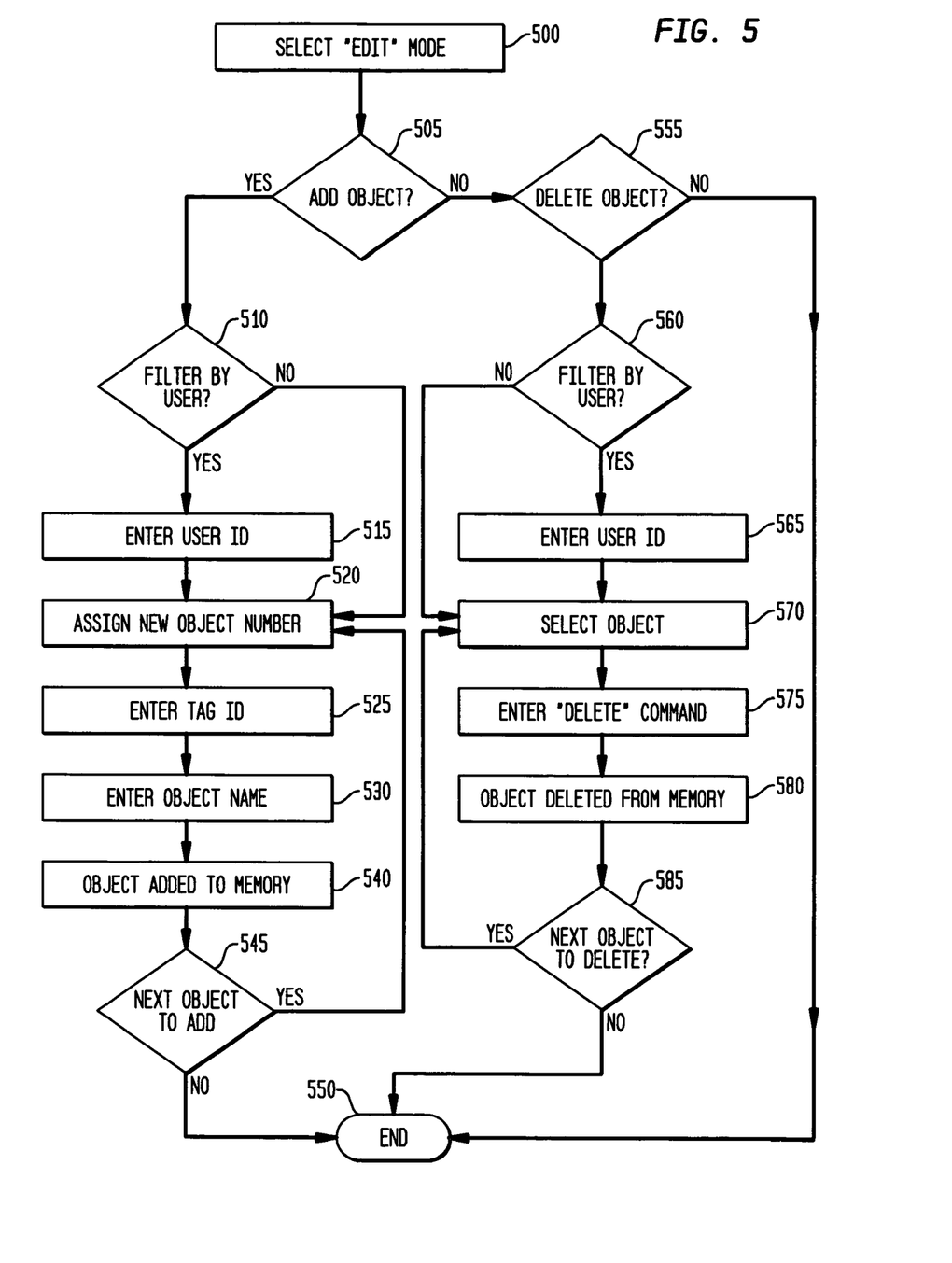
FIG. 5 illustrates an example method for editing information regarding objects to be located according to the invention.

FIG. 5 illustrates a method for editing information regarding objects to be located according to the invention. At block 500, the user selects the edit mode on the user interface device 400, e.g., by entering an appropriate key sequence, such as "*1". The user may have previously entered a password or the like for accessing the user interface device 400. If a new object is being added (block 505), the user optionally determines whether the object should be filtered by user (block 510). This feature allows specific objects to be associated with a specific user. As an example, there may be two members of a household who each use the electronic tags to locate their glasses. Some confusion may be created if the display 410 provides two entries for "glasses". By filtering, only the glasses of the corresponding user will be displayed. Also, when a large number of objects have been learned to the user interface device 400, a subset of the objects can be displayed while in the "search" mode to enable a particular user to quickly find the objects of interest to him or her without scrolling through the entire list of objects on the display 410. If the filter feature is selected, the user enters an identifier such as their name, initials, or ID number (block 515) to associate the new object with their identity.

At block 520, a new object number may be assigned to the object that is to be entered. For example, assuming that five objects are already learned, the new object may be assigned number six by the control logic associated with the user interface device 400. At block 525, the tag identifier is entered. The user simply reads the identifier from the tag, such as identifier 220 in FIG. 2(a), and presses the corresponding key sequence using the keypad 420. If the identifier is in machine-readable form, an appropriate peripheral to the user interface device 400, such as a bar code reader, is used to read the identifier. At block 530, the user enters descriptive information regarding the object with which the tag is associated. This would typically be a text string, e.g., "glasses". At block 540, the object is added to a memory associated with the user interface device 400 by storing the tag identifier and the associated descriptive information. The "add" key can be used for this purpose. This information can subsequently be retrieved to allow the user to select an object to locate, and to transmit a signal encoded with the corresponding identifier. The process is repeated to add additional objects at block 545, or terminated at block 550.

Also in the edit mode, the user may choose to delete objects at block 555. This may be done on a user-filtered basis at blocks 560 and 565 by allowing a user to only delete the objects that have previously been associated with the user. The user selects an object to be deleted at block 570 from a list of objects, e.g., that appear in the display 410, and enters a "delete" command (block 575) such as by pressing the "delete" key. For example, the user may press the "select" key in the keypad 420 once to select an object in the list, at which time the display 410 asks "Delete object?" The user may press the "enter" key again to delete the object. The object is then deleted from the memory associated with the user interface device 400 by deleting the identifier of the associated tag and the descriptive information. The process is repeated to delete additional objects at block 585, or terminated at block 550.

The edit feature advantageously allows the user to add, delete and modify information as needed. For example, if an electronic tag is moved from one object to another, the associated descriptive information can be updated. Moreover, if additional tags are purchased, or if tags are given away to friends or thrown away when no longer operating, the corresponding information can be added and deleted as needed.

Figure 6:
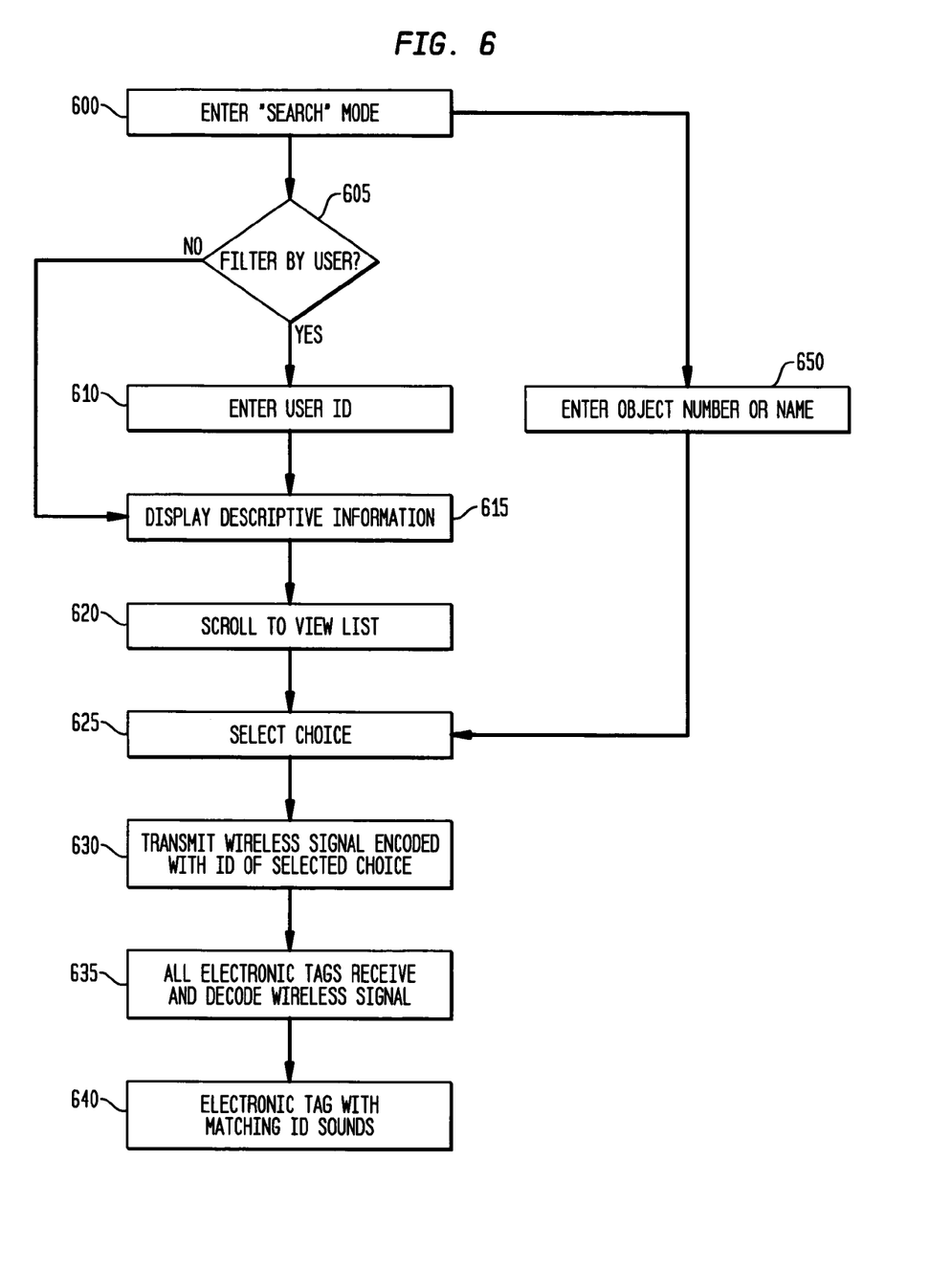
FIG. 6 illustrates an example method for locating objects according to the invention.

FIG. 6 illustrates a method for locating objects according to the invention. Objects that have been learned to the user interface device 400 can now be located. At block 600, the user selects the search mode on the user interface device 400, e.g., by entering an appropriate key sequence, such as "*2". The user may have previously entered a password or the like for accessing the user interface device 400. At block 605, the user decides if the list of objects that are displayed by the display 410 should be filtered by user. If so, the user enters the user identifier at block 610. The descriptive information for the objects, such as object name and number, are displayed at block 615. An example is provided in display 410 for the objects: glasses, purse, and wallet. The user may scroll up or down in the display 410 to view additional objects (block 620). The display 410 may indicate the total number of objects. At block 625, the user selects an object, such as by moving the arrow keys until the cursor is next to the desired object, and pressing the "select" key. Or, at block 650, the user can enter the object's sequence number directly, instead of scrolling among the different entries. For example, the display 410 uses "1" for "glasses", "2" for "purse", "3" for wallet", "4" for "child 1" or the child's actual name, e.g., Sue, and "5" for "pet 1" or the pet's actual name, e.g., Fido. The user may also enter a letter such as "g" which causes the display 410 to display all objects that begin with "g", e.g., "glasses".

A template, stickers or the like may be used with the keypad 420 to provide information for the object locator feature. For example, specific keys may be "soft" keys that enable the user to locate specific objects, e.g., key "1" locates "glasses, key "2" locates purse, etc., when the user interface device 400 is in a "search" mode. Dedicated hard keys to "find object 1", find object 2" and so forth may also be used.

Once an object is selected, at block 630, the wireless activation signal is transmitted that is encoded with the identifier of the electronic tag that was associated with the object in the learn mode. Any type of encoding, modulation, and wireless transmission scheme may be used. At block 635, all of the electronic tags within range of the activation signal receive and decode the signal to recover the identifier. At block 640, the tag whose pre-stored identifier matches the decoded identifier sounds off to signal its location.

In a further aspect of the invention, a polling schedule can be set so that an electronic tag is activated periodically or at other specified times to confirm the presence of an object such as a child or pet in the home. This may be done to assure a parent that a child or pet has not wandered from the home or surrounding area. With this approach, the control 114 causes a signal encoded with the identifier of one or more specified electronic tags to be transmitted at specified times, e.g. every fifteen minutes. The corresponding tag receives the signal and sounds off to confirm its presence. The polling schedule can be set automatically by the control, or can be set by the user via the user interface 140. The user can also turn the polling feature on or off as desired, or set it to turn on or off at specified times, e.g., based on time of day, day of week, etc.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A security system with an object locator feature, comprising:
   a user interface device including a user output component and a user input component, said user input component is adapted to generate an instruction for controlling at least an operational status of the security system and generate an instruction for producing an alarm signal;
   a memory associated with the user interface device for storing identifiers for electronic tags associated with a plurality of objects, and storing descriptive information for the plurality of objects;
   wherein the user output component provides the descriptive information to a user to enable the user to select at least one of the plurality of objects via the user input component;
   a control responsive to the user input component for retrieving, from the memory, the identifier for the electronic tag that is associated with the at least one selected object and for controlling the security system based upon the instruction from the user input component; and
   a transmitter responsive to the control for transmitting a wireless signal encoded with the retrieved identifier,
   wherein said user interface device, said transmitter and control are integrated in a security system keypad.

2. The security system of claim 1, wherein:
   the control controls security system components in the security system said security system components including at least a sensor and a siren device.

3. The security system of claim 1, wherein:
   the transmitter transmits a wireless signal to at least one security system component in the security system.

4. The security system of claim 1, wherein:
   the user output component comprises a display.

5. The security system of claim 1, wherein:
   the descriptive information for the plurality of objects is editable by the user via the user input component.

6. The security system of claim 1, wherein:
   the memory stores the identifiers for the electronic tags responsive to inputs provided by the user via the user input component.

7. The security system of claim 1, wherein:
   the user enters a string of characters comprising at least one of numbers and letters via the user input component to provide the identifiers for the electronic tags that are stored by the memory.

8. The security system of claim 1, wherein:
   the objects comprise at least one inanimate object.

9. The security system of claim 1, wherein:
   the objects comprise at least one living being.

10. A method for providing an object locator feature for a security system, comprising:
    receiving a unique passcode from a user interface device;
    determining whether the unique passcode matches a preset passcode and allowing access to the security system based upon said determination;
    storing identifiers for electronic tags associated with a plurality of objects, and storing descriptive information for the plurality of objects, in a memory associated with the user interface device of the security system;

providing the descriptive information to a user via a user output component of the user interface device to enable the user to select at least one of the plurality of objects via a user input component of the user interface device;
retrieving, from the memory, the identifier for the electronic tag that is associated with the at least one selected object;
generating a wireless enable signal at the user interface, said wireless enable signal is encoded with the retrieved identifier;
transmitting the wireless enable signal to a remote security system control panel; and
transmitting a wireless activation signal from the remote security system control panel, said wireless activation signal is encoded with the retrieved identifier.

11. The method of claim 10, further comprising:
inputting the identifiers via the user input component.

12. The method of claim 10, further comprising:
inputting the descriptive information via the user input component.

13. The method of claim 10, further comprising:
editing the descriptive information via the user input component.

14. The method of claim 10, wherein:
the user enters a string of characters comprising at least one of numbers and letters via the user input component to provide the identifiers for the electronic tags for use in said storing step.

15. A program storage device, tangibly embodying a program of instructions executable by a machine to perform a method for providing an object locator feature for a security system, the method comprising the steps of:
receiving a unique passcode from a user interface device;
determining whether the unique passcode matches a preset passcode and allowing access to the security system based upon said determination;
storing identifiers for electronic tags associated with a plurality of objects, and storing descriptive information for the plurality of objects, in a memory associated with a user interface device of the security system;
providing the descriptive information to a user via a user output component of the user interface device to enable the user to select at least one of the plurality of objects via a user input component of the user interface device;
retrieving, from the memory, the identifier for the electronic tag that is associated with the at least one selected object;
generating a wireless enable signal at the user interface, said wireless enable signal is encoded with the retrieved identifier;
transmitting the wireless enable signal to a remote security system control panel; and
transmitting a wireless activation signal from the remote security system control panel, said wireless activation signal is encoded with the retrieved identifier.

16. The program storage device of claim 15, wherein the method further comprises:
inputting the identifiers via the user input component.

17. The program storage device of claim 15, wherein the method further comprises:
inputting the descriptive information via the user input component.

18. The program storage device of claim 15, wherein:
the descriptive information comprises a name and number for each object.

19. The program storage device of claim 15, wherein the method further comprises:
editing the descriptive information via the user input component.

20. The program storage device of claim 15, wherein:
the user enters a string of characters comprising at least one of numbers and letters via the user input component to provide the identifiers for the electronic tags for use in said storing step.

21. An electronic tag for use with an object locator feature of a security system, comprising:
a memory for storing an identifier;
a receiver for receiving a wireless signal encoded with an identifier that was retrieved by a security system keypad from a memory of the security system, said security system keypad adapted to generate an instruction for controlling at least an operational status of the security system;
a control for comparing the stored identifier to the received identifier; and
a sounder responsive to the control for emitting an audible sound when the stored identifier matches the received identifier.

22. The electronic tag of claim 21, wherein
the identifier that was retrieved by the security system keypad from the memory of the security system is retrieved in response to a user input component of the security system.

23. The electronic tag of claim 21, wherein
the identifier that was retrieved by the security system keypad from the memory of the security system is retrieved in response to a polling schedule of the security system.

24. The electronic tag of claim 21, wherein the electronic tag periodically wakes up to check for a wireless signal.

25. A security system with an object polling feature, comprising:
a security system keypad includes user interface device, a memory and first control section, the user interface device including a user output component and a user input component, said user input component adapted to generate an instruction for controlling at least an operational status of the security system, the memory storing identifiers for electronic tags associated with a plurality of objects, and storing descriptive information for the plurality of objects, the user output component provides the descriptive information to a user to enable the user to select at least one of the plurality of objects via the user input component and the user interface device activates a polling feature,
the first control section responsive to the user input component for retrieving, from the memory, the identifier for the electronic tag that is associated with the at least one selected object, said first control section generates a wireless enable signal; and
security system control panel including a second control section and a transmitter, said second control section responsive to the wireless enable signal, the
transmitter responsive to the second control section for transmitting a wireless signal encoded with the retrieved identifier according to a polling schedule associated with the polling feature, wherein said security system control panel is remotely located from the security system keypad.

26. The security system of claim 25, wherein
the user interface device receives setting instructions for the polling feature.

* * * * *